United States Patent
Phegade et al.

(10) Patent No.: US 9,536,100 B2
(45) Date of Patent: Jan. 3, 2017

(54) SCALABLE SECURE EXECUTION

(75) Inventors: Vinay Phegade, Beaverton, OR (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,416

(22) PCT Filed: Apr. 16, 2012

(86) PCT No.: PCT/US2012/033748
§ 371 (c)(1),
(2), (4) Date: May 23, 2014

(87) PCT Pub. No.: WO2013/158060
PCT Pub. Date: Oct. 24, 2013

(65) Prior Publication Data
US 2015/0143543 A1  May 21, 2015

(51) Int. Cl.
| H04L 29/06 | (2006.01) |
| G06F 21/60 | (2013.01) |
| H04W 12/06 | (2009.01) |
| G06F 9/54 | (2006.01) |

(52) U.S. Cl.
CPC ............ *G06F 21/606* (2013.01); *G06F 9/54* (2013.01); *H04W 12/06* (2013.01)

(58) Field of Classification Search
CPC .................................................. G06F 21/606
See application file for complete search history.

(56) References Cited

U.S. PATENT DOCUMENTS

| 2003/0084435 A1 | 5/2003 | Messer et al. |
| 2006/0206932 A1 | 9/2006 | Chong |
| 2006/0267860 A1* | 11/2006 | Rinaldo et al. ............... 345/1.2 |
| 2008/0141313 A1* | 6/2008 | Kato et al. ..................... 725/62 |
| 2008/0307515 A1 | 12/2008 | Drokov et al. |
| 2009/0222659 A1 | 9/2009 | Miyabayashi et al. |

(Continued)

FOREIGN PATENT DOCUMENTS

| JP | 2006-502457 A | 1/2006 |
| JP | 2011-511355 A | 4/2011 |

(Continued)

OTHER PUBLICATIONS

Palaniswamy, Nirmala, et al. "Notice of Violation of IEEE Publication Principles Enhanced Blowfish algorithm using bitmap image pixel plotting for security improvisation." 2010 2nd International Conference on Education Technology and Computer. vol. 1. IEEE, 2010.*

(Continued)

*Primary Examiner* — Shawnchoy Rahman
(74) *Attorney, Agent, or Firm* — Alpine Technology Law Group LLC (57) ABSTRACT

In one embodiment a controller comprises logic configured to establish a pairing with a remote processor in a second electronic device, create a first secure communication channel with the remote processor, transmit a first portion of a processing task to the remote processor via the first secure channel, receive, via a second communication channel, an input from the first portion of the processing task, and complete at least a second portion of the processing task using the input. Other embodiments may be described.

16 Claims, 5 Drawing Sheets

(56) References Cited

U.S. PATENT DOCUMENTS

| | | |
|---|---|---|
| 2010/0254349 A1 | 10/2010 | Aibara et al. |
| 2011/0078445 A1 | 3/2011 | Xiao et al. |
| 2011/0114718 A1 | 5/2011 | Wilds et al. |
| 2012/0072972 A1 | 3/2012 | Christiansen et al. |
| 2012/0079123 A1 | 3/2012 | Brown et al. |
| 2012/0130905 A1* | 5/2012 | Tsudik et al. .................. 705/75 |
| 2015/0081257 A1* | 3/2015 | Cen et al. ......................... 703/2 |
| 2015/0143543 A1* | 5/2015 | Phegade .............. H04W 12/06 726/29 |

FOREIGN PATENT DOCUMENTS

| | | |
|---|---|---|
| KR | 10-2014-0136006 A | 11/2014 |
| WO | 2008/094742 A1 | 8/2008 |

OTHER PUBLICATIONS

Notice of Allowance received for Korean Patent Application No. 10-2014-7026704, mailed on Jan. 15, 2016, 2 pages of Notice of Allowance and 3 pages of allowed claims in English.

International Search Report and Written Opinion received for PCT Application No. PCT/US2012/033748, mailed on Dec. 12, 2012, 9 pages.

International Preliminary Report on Patentability received for International Application No. PCT/US2012/033748, mailed on Oct. 30, 2014.

Extended European Search Report received for European Patent Application No. 12874403.4, mailed on Nov. 12, 2015, 6 pages.

Office Action received for Japanese Patent Application No. 2015-501650, mailed on Nov. 17, 2015, 10 pages including 5 pages of English translation.

Office Action received for Korean Patent Application No. 10-2014-7026704, mailed on Jun. 22, 2015, 4 pages, including 1 page of English translation.

Office Action received for Korean Patent Application No. 10-2014-7026704, mailed on Jun. 13, 2016, 4 pages including one page of English translation.

Office Action received for Japanese Patent Application No. 2015-501650, mailed on Aug. 9, 2016, 4 pages including 2 pages of English translation.

Notice of Allowance received for Korean Patent Application No. 10-2016-7009764, mailed on Oct. 21, 2016, 2 pages of Notice of Allowance and 3 pages of allowed claims in English.

\* cited by examiner

SCALABLE SECURE EXECUTION

BACKGROUND

The subject matter described herein relates generally to the field of computing and more particularly to systems and methods which allows an electronic devices to utilize processing capacity in a remote electronic device.

In a typical electronic commerce transaction the merchant (and underlying ecosystem), is not certain that the individual conducting the transaction is the authorized person. When fraudulent transactions are accepted by the online ecosystem there is an underlying fraud cost that is generally borne by the relying party, in this example the merchant, or by the defrauded individual.

Another weakness in the online space is the ever-present threat of system malware, which is often used to steal personal information, including payment credentials, for use by unauthorized individuals. This threat has an effect on a certain percentage of the population who will not conduct online activity due to fear of having their information compromised. This reduces efficiencies that can be gained through online commerce and limits the amount of goods and services purchased by concerned individuals, limiting the growth of online commerce.

Some computing systems may utilize a secure controller, separate from the main processor, encased in a trusted execution complex to manage authentication processes. Secure controllers may have limited computational and memory resources, such that computationally expensive tasks may be challenging for secure controllers to implement.

Accordingly systems and techniques to provide secure execution to enable computationally expensive tasks to be offloaded to a remote processor may find utility.

BRIEF DESCRIPTION OF THE DRAWINGS

The detailed description is described with reference to the accompanying figures.

DETAILED DESCRIPTION

Described herein are exemplary systems and methods to implement scalable secure execution in electronic devices. Some embodiments of the systems and methods described herein may find utility in the context of network security, and particularly in electronic commerce settings. Some embodiments described herein may enable a trusted execution engine, also sometimes referred to as a secure processor or a manageability engine, to offload one or more portions of a processing task to a remote processor which may be located on a separate processing device. By way of example, in the context of a electronic commerce application a trusted execution engine in a first computing device may offload graphics-intensive operations such as bitmap generation to a remote processor located on a separate computing device. The remote processor may forward the bitmap to an application executing on the untrusted execution complex of the first device, which may present the bitmap on a display and collect input from the display. Offloading the bitmap generation to a remote processor inhibits malware on the first device from interfering with or snooping user inputs or outputs from the bitmap region.

This document provides description of hardware and software environments in which scalable secure execution may be implemented and of exemplary operations to implement scalable secure execution. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
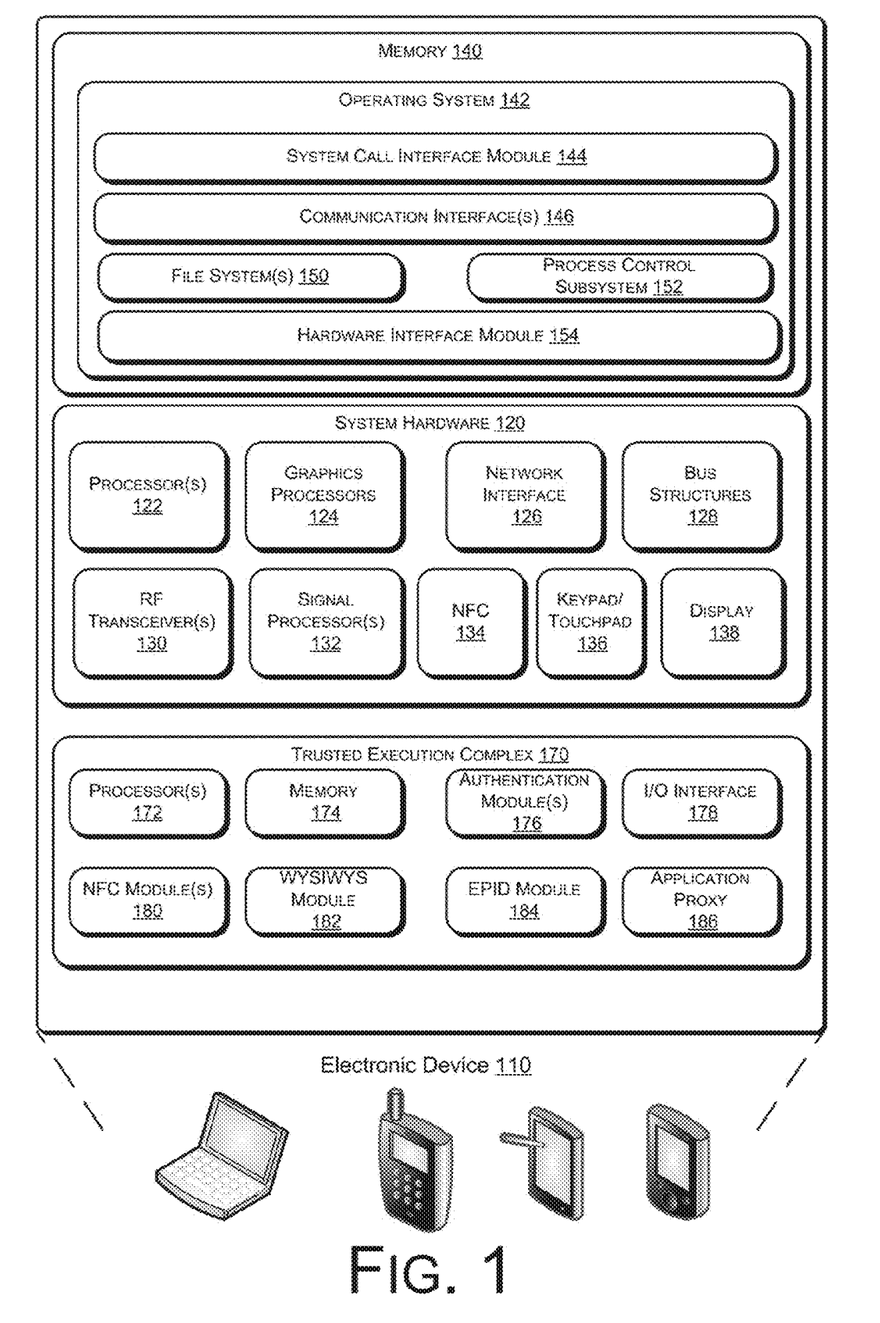
FIG. 1 is a schematic illustration of an exemplary electronic device which may be adapted to include infrastructure to implement scalable secure execution in accordance with some embodiments.

FIG. 1 is a schematic illustration of an exemplary electronic device 110 which may be adapted to implement scalable secure execution in accordance with some embodiments. As illustrated in FIG. 1, electronic device 110 may be embodied as a conventional mobile device such as a mobile phone, tablet computer portable computer, or personal digital assistant (PDA).

In some embodiments an electronic device may include a trusted execution complex, which may also be referred to as a trusted execution engine or sometimes as a secure element or a manageability engine. The trusted execution complex may comprise one or more controllers that are separate from the primary execution complex, sometimes referred to as an untrusted execution complex. The separation may be physical in the sense that the trusted execution complex may be physically separate from the untrusted execution complex. Alternatively, the trusted execution complex may logical in the sense that the trusted execution complex may be hosted on same chip or chipset that hosts the untrusted execution complex, but separated at the silicon level such that the trusted execution complex is secure.

In various embodiments, electronic device 110 may include or be coupled to one or more accompanying input/output devices including a display, one or more speakers, a keyboard, one or more other I/O device(s), a mouse, or the like. Exemplary I/O device(s) may include a touch screen, a voice-activated input device, a track ball, a geolocation device, an accelerometer/gyroscope, biometric feature input devices, and any other device that allows the electronic device 110 to receive input from a user.

The electronic device 110 includes system hardware 120 and memory 140, which may be implemented as random access memory and/or read-only memory. A file store may be communicatively coupled to computing device 110. The file store may be internal to computing device 110 such as, e.g., eMMC, SSD, one or more hard drives, or other types of storage devices. File store 180 may also be external to computer 110 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel®

Atom™ based System-on-a-Chip (SOC) or Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 110 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 110 may include an RF transceiver 130 to transceive RE signals, a Near Field Communication (NFC) radio 134, and a signal processing module 132 to process signals received by RE transceiver 130. RE transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN-Part TI: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3:0.1, December 2002).

Electronic device 110 may further include one or more input/output interfaces such as, e.g., a keypad 136 and a display 138. In some embodiments electronic device 110 may not have a keypad and use the touch panel for input.

Memory 140 may include an operating system 142 for managing operations of computing device 110. In one embodiment, operating system 142 includes a hardware interface module 154 that provides an interface to system hardware 120. In addition, operating system 140 may include a file system 150 that manages files used in the operation of computing device 110 and a process control subsystem 152 that manages processes executing on computing device 110.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

Electronic device 110 may comprise a trusted execution engine 170. In some embodiments the trusted execution engine 170 may be implemented as an independent integrated circuit located on the motherboard of the electronic device 110, while in other embodiments the trusted execution engine 170 may implemented as a dedicated processor block on the same SOC die, while in other embodiments the trusted execution engine may be implemented on a portion of the processor(s) 122 that is segregated from the rest of the processor(s) using HW enforced mechanisms In the embodiment depicted in FIG. 1 the trusted execution engine 170 comprises a processor 172, a memory module 174, one or more authentication module(s) 176, and an I/O module 178, a near field communication (NFC) module, a what you see is what you sign (WYSIWYS) module 182, an enhanced privacy identification (EPID) module 184 and one or more application proxies 186. In some embodiments the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the trusted execution engine 170 is separate from the main processor(s) 122 and operating system 142, the trusted execution engine 170 may be made secure, i.e., inaccessible to hackers who typically mount SW attacks from the host processor 122.

In some embodiments the trusted execution engine may define a trusted execution complex in a host electronic device in which scalable secure execution procedures may be implemented to allow portions of a processing task to be offloaded to a remote processor on a different electronic device. Offloading the processing onto a remote processor inhibits the ability of malware or snooping software executing on the untrusted execution complex to tamper with or read inputs, outputs, or processing results form operations.

Figure 2:
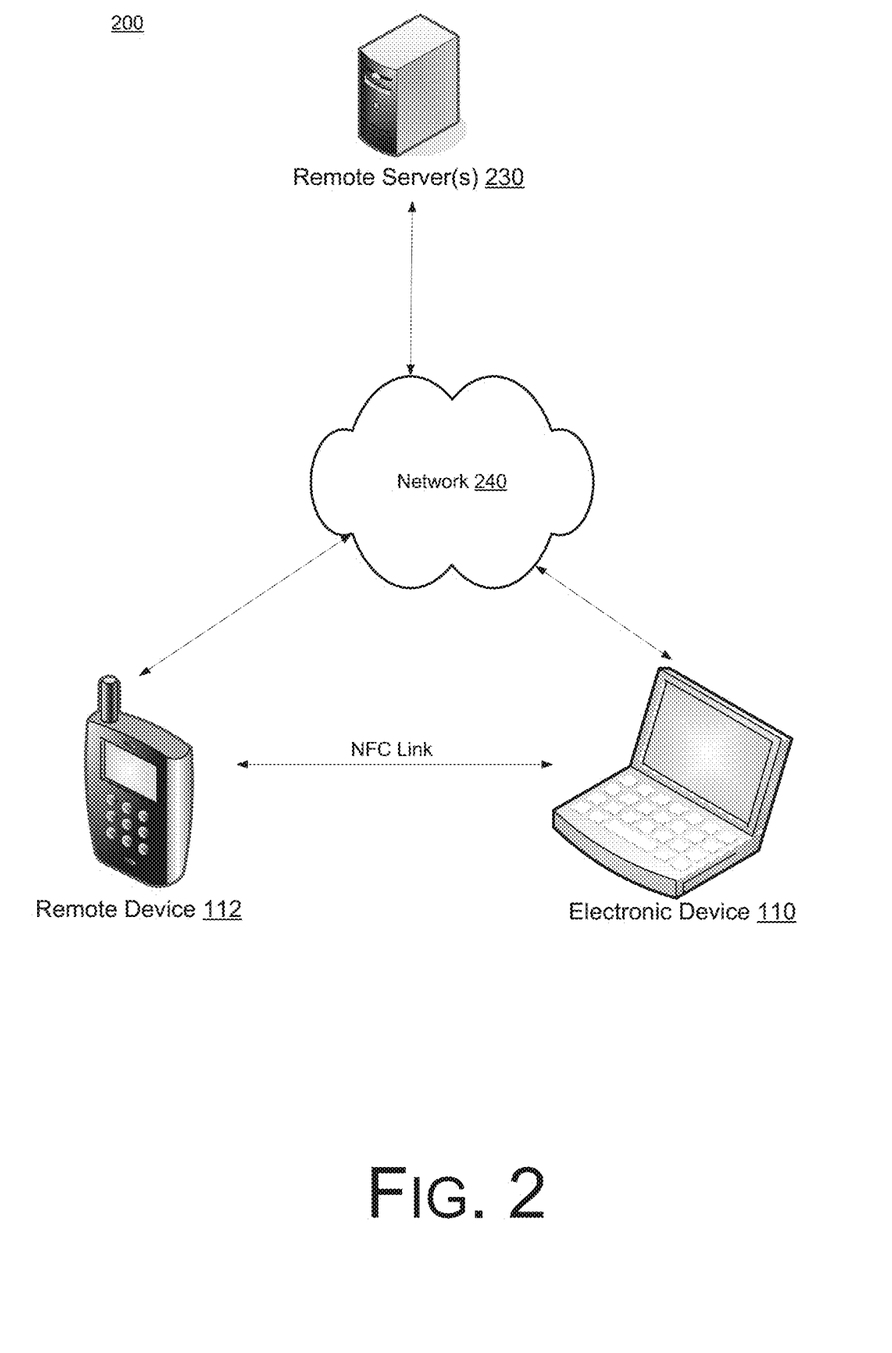
FIG. 2 is a high-level schematic illustration of an exemplary network architecture for scalable secure execution in accordance with some embodiments.

FIG. 2 is a high-level schematic illustration of a network environment in which scalable secure execution procedures may be implemented. Referring to FIG. 2, an electronic device 110 and a remote device 112 may be coupled to one or more remote servers 230 via a network 240. Electronic device 110 may comprise a near field communication (NFC) interface to enable wireless communication with remote device 112 via a suitable near field communication link. In some embodiments each of electronic device 110 and remote device 112 may be embodied as a mobile telephone, tablet, PDA or other mobile computing device as described with reference to electronic device 110, above. Network 240 may be embodied as a public communication network such as, e.g., the internet, or as a private communication network, or combinations thereof.

Remote server(s) 230 may be embodied as computer systems. In some embodiments the server(s) 230 may be embodied as an electronic commerce server and may be managed by a vendor or by a third party which operates a secure platform. Other remote server(s) 230 may be operated by a vendor or by a third-party payment system, e.g., a transaction clearing service or a credit card service.

Figure 3:
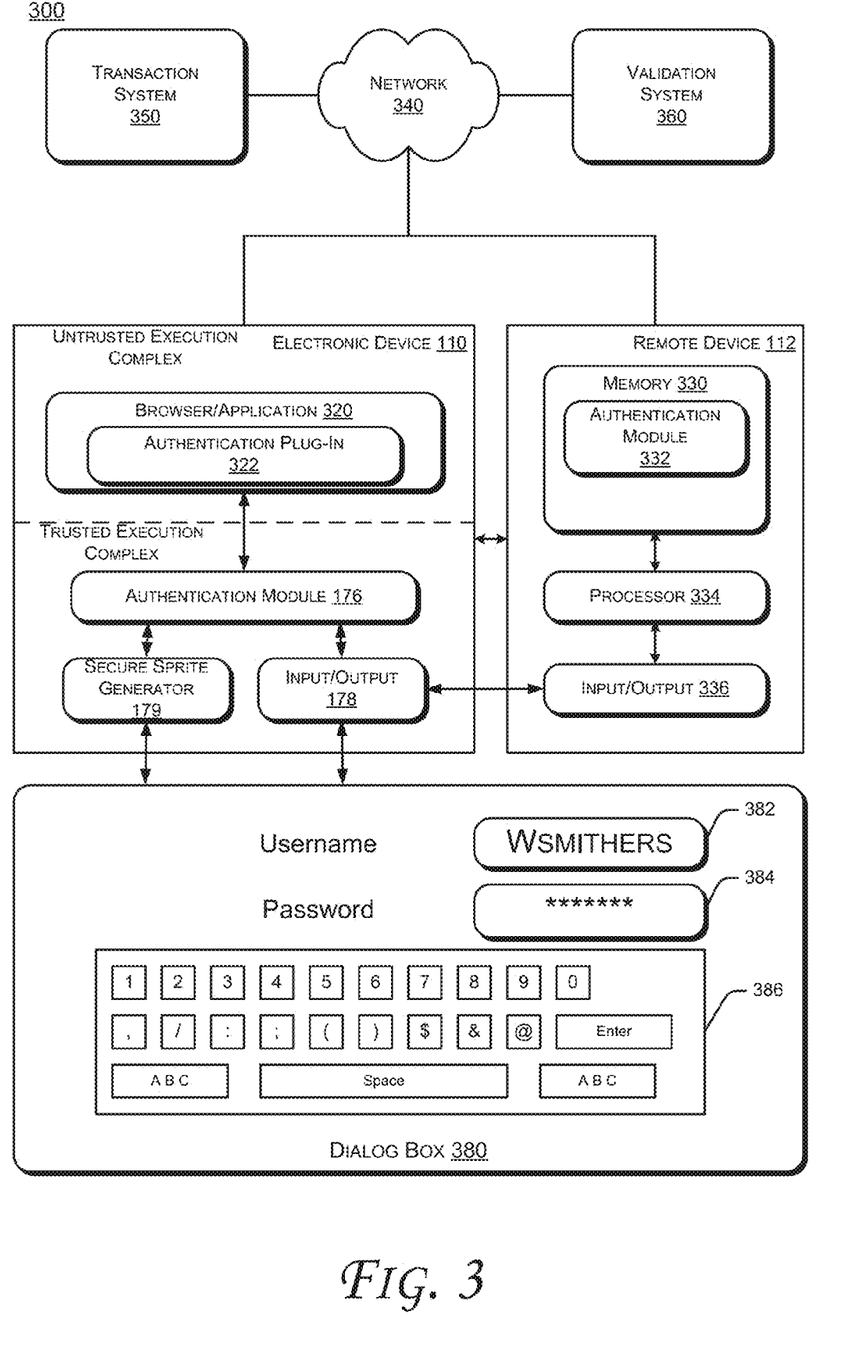
FIG. 3 is a schematic illustration of an exemplary architecture for scalable secure execution in accordance with some embodiments.

FIG. 3 is a more detailed, schematic illustration of a system to implement scalable secure execution according to some embodiments. Referring to FIG. 3, the electronic device 110 may be coupled to a transaction system 350 via network 340, In addition, the electronic device 110 may be coupled to a validation system 360, which may be separate from or integrated with transaction system 350. Similarly, in some embodiments the remote device 112 may also be coupled to a transaction system 350 and validation system 360 via network 340.

In some embodiments a browser or other application 320 may execute in the untrusted execution complex of electronic device 110. Browser 320 may include an authentication plug-in 322 which cooperates with authentication module 176 that executes on the trusted execution complex of electronic device 110. Remote device 112 includes an input output module 336, a processor 334, and an authentication module 322 residing in memory 330.

Remote entities that manage transactions, identified as a transaction system 350 in FIG. 2, may be embodied as electronic commerce websites or the like and may be coupled to the host device via a communication network 340. In use, an owner or operator of electronic device 110 may access the transaction system 350 using a browser 320 or other application software via the network to initiate an electronic commerce transaction on the system 350.

The authentication module 176, alone or in combination with an authentication plug-in 322, the input/output module 178 and the secure sprite generator 179, and the processor 334 and authentication module 332 on remote device 112 may implement scalable secure execution operations in which portions of a processing task implemented by the processor 172 are offloaded to remote processor 334 of remote device 112.

Having described various structures of a system to implement scalable secure execution, operating aspects of a system will be explained with reference to FIG. 4. In some embodiments the operations depicted in the flowchart of FIG. 4 may be implemented by processor 172 of the trusted execution engine 170, alone or in combination with the processor 122 on that executes in the untrusted execution complex of electronic device and the processor 334 of remote device 112.

Figure 4:
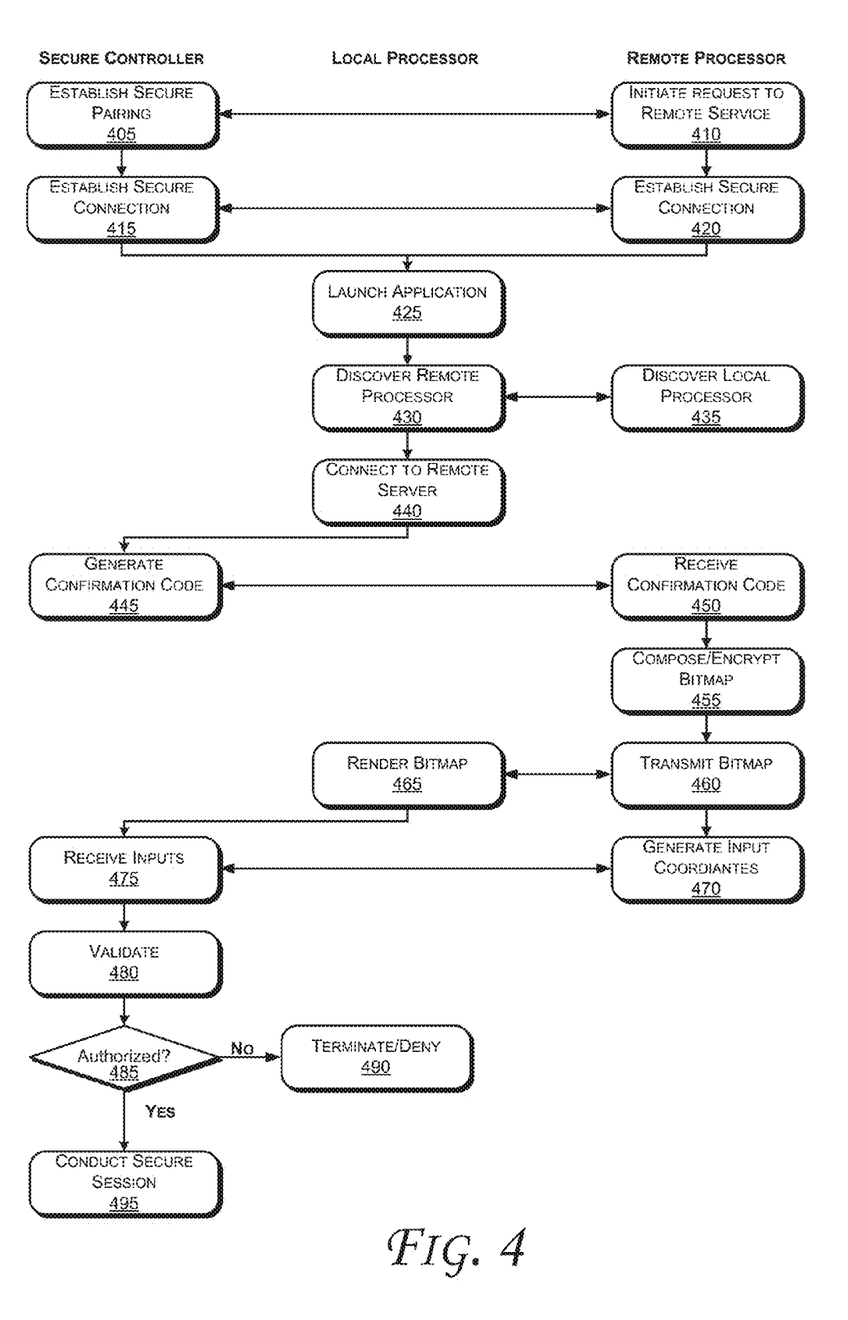
FIG. 4 is a flowchart illustrating operations in a method to implement scalable secure execution in accordance with some embodiments.

Referring to FIG. 4, in some embodiments the operations depicted in FIG. 4 at operations 405 and 410 a secure pairing is established between the trusted execution engine, also referred to as the secure controller, and the remote processor, e.g., the processor 334 on remote device 112. In some embodiments the pairing may be initiated by a user initiating a registration sequence, e.g., by tapping remote device 112 on the electronic device 110 or otherwise launching a registration process. In response to the registration request the processor 172 of the trusted execution engine 170 launches the authentication module 176 and the processor 334 of remote device 112 launches the authentication module 332. The respective authentication modules 322, 332 may develop a shared secret using a suitable cryptographic algorithm, e.g., a Diffie-Hellman key exchange protocol or the like.

At operations 415 and 420 the trusted execution engine 170 and the remote processor 334 establish a secure communication connection by way of their respective input/output module 178, 336. The communication connection may be implemented via a wireless connection or any other suitable communication medium, e.g., an infrared connection or a wired network connection.

At operation 425 a browser 320 or other suitable application is launched on the local processor 122 of the electronic device 110. At operations 430 and 435 a discovery process is implemented between the electronic device 110 and the remote device 112. By way of example, in some embodiments the devices 110, 112 may comprise a Bluetooth or other wireless networking capability and may discover one another via the wireless network.

At operation 440 the application on the browser connects to a remote server. By way of example, in the embodiment depicted in FIG. 3 the browser may be used to connect to a transaction system 350, which may be an electronic commerce web site or the like. In some embodiments the electronic device 110 receives a login request from the remote server, and in response the authentication plug-in 322 which executes in the untrusted execution complex invokes the authentication module 176 in the trusted execution complex.

In some embodiments the trusted execution complex may generate a bitmap image for a login screen and present it on the display 138 of the electronic device. By way of example, in some embodiments the WYSIWYS module 182 opens a secure window on a display of electronic device and presents an authorization request in a dialog box 380 on the window. A user of the electronic device 110 responds to the authorization request by entering an input in the secure window, which authorizes the login request. The WYSIWYS module 182 may generate a pin which is associated with the input.

However, in some embodiments the trusted execution complex offloads the process of generating a bitmap to the processor 334 on the remote device 112. In such embodiments the authentication module 176 executing on processor 172 generates a confirmation code and forwards the confirmation code and a confirmation page to processor 334 on the remote device 112.

At operation 450 the processor 334 on remote device 112 receives the confirmation code, and at operation 455 the processor 334 composes the bitmap and encrypts the bitmap using the shared secret. In addition, the processor 334 on remote device 112 generates coordinates for user input elements such as a username and password combination.

The bitmap is passed back to the electronic device 110. In some embodiments the secure sprite generator 179 may render the bitmap on the display 138. In other embodiments the graphics processor(s) 124 in the untrusted execution complex may render the bitmap on display 138. Referring briefly to FIG. 3, the rendered bitmap pay present a dialog box 380 on the display. Dialog box 380 may comprise an input window 382 for a username, an input window 384 for a password, and an input mechanism such as a keyboard 386 for the user to enter inputs in the dialog box 380.

A user may enter a username/password combination in the respective windows 382, 384 using the keyboard 386. At operation 475 the inputs are received in the secure controller. In some embodiments the trusted execution engine blocks the bitmap region from the system hardware such that inputs into the dialog box 380 are not visible to the untrusted execution complex. In such embodiments the inputs may be detected directly by input/output interface 178. In other embodiments the inputs may be detected by the inputs may be captured by the authentication plug-in 322 executing in the untrusted execution complex. In such embodiments it should be noted that sniffing by malware is inhibited because the input coordinates were generated on processor 334 of remote device 112. Thus, malware would lack knowledge of the input coordinates or the inputs associated with the coordinates.

At operation 480 the user inputs are validated. By way of example, in some embodiments the authentication module 176 invokes the EPID module 184, which generates and wraps an identification packet and applies a signature that attests that the packet was obtained securely over the NFC communication link and that the WYS pin was obtained securely using the WYSIWYS module 182. The electronic device 110 forwards the wrapped identification packet to a remote validation server 460, which validates the user input and returns an authorization response to the electronic device 110. In some embodiments the validation response is received via the I/O interface 178 in the trusted execution engine 170 and is therefore not accessible to the untrusted operating environment of the electronic device 110.

At operation 485 the authentication module 176 reviews the response from the remote validation server 460. If, at operation 485, the response from the remote authentication server 430 indicates that the login is not authorized then control passes to operation 490 and the login procedure is terminated and access denied. By contrast, if at operation 485 the response from the remote authentication server 430 indicates that the login is authorized then control passes to operation 495 and a secure communication session may be initiated between the electronic device 110 and the transaction system 350.

Figure 5:
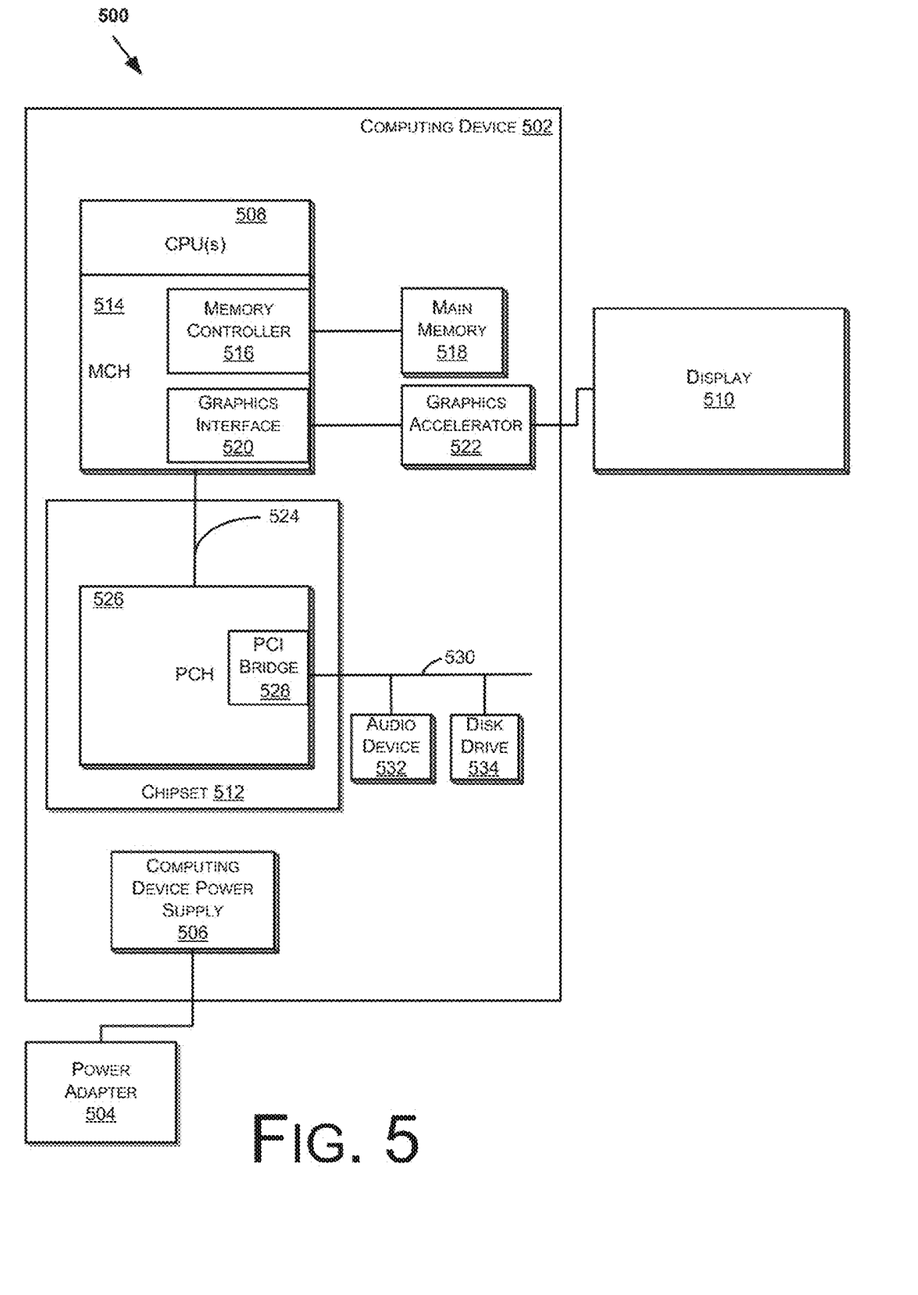
FIG. 5 is a schematic illustration of an exemplary system for scalable secure execution, in accordance with some embodiments.

As described above, in some embodiments the electronic device 110 may be embodied as a computer system. FIG. 5 is a schematic illustration of a computer system 500 in accordance with some embodiments. The computer system 500 includes a computing device 502 and a power adapter 504 (e.g., to supply electrical power to the computing device 502). The computing device 502 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 502 (e.g., through a computing device power supply 506) from one or more of the following sources: one or more battery packs, an alternating current (AC) outlet (e.g., through a transformer and/or adaptor such as a power adapter 504), automotive power supplies, airplane power supplies, and the like. In some embodiments, the power adapter 504 may transform the power supply source output (e.g., the AC outlet voltage of about 110 VAC to 240 VAC) to a direct current (DC) voltage ranging between about 5 VDC to 12.6 VDC. Accordingly, the power adapter 504 may be an AC/DC adapter.

The computing device 502 may also include one or more central processing unit(s) (CPUs) 508. In some embodiments, the CPU 508 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON, and Celeron® processors. Also, one or more processors from other manufactures may be utilized. Moreover, the processors may have a single or multi core design.

A chipset 512 may be coupled to, or integrated with, CPU 508. The chipset 512 may include a memory control hub (MCH) 514. The MCH 514 may include a memory controller 516 that is coupled to a main system memory 518. The main system memory 518 stores data and sequences of instructions that are executed by the CPU 508, or any other device included in the system 500. In some embodiments, the main system memory 518 includes random access memory (RAM); however, the main system memory 518 may be implemented using other memory types such as dynamic RAM (DRAM), synchronous DRAM (SDRAM), and the like. Additional devices may also be coupled to the bus 510, such as multiple CPUs and/or multiple system memories.

The MCH 514 may also include a graphics interface 520 coupled to a graphics accelerator 522. In some embodiments, the graphics interface 520 is coupled to the graphics accelerator 522 via an accelerated graphics port (AGP). In some embodiments, a display (such as a flat panel display) 540 may be coupled to the graphics interface 520 through, for example, a signal converter that translates a digital representation of an image stored in a storage device such as video memory or system memory into display signals that are interpreted and displayed by the display. The display 540 signals produced by the display device may pass through various control devices before being interpreted by and subsequently displayed on the display.

A hub interface 524 couples the MCH 514 to an platform control hub (PCH) 526. The PCH 526 provides an interface to input/output (I/O) devices coupled to the computer system 500. The PCH 526 may be coupled to a peripheral component interconnect (PCI) bus. Hence, the PCH 526 includes a PCI bridge 528 that provides an interface to a PCI bus 530. The PCI bridge 528 provides a data path between the CPU 508 and peripheral devices. Additionally, other types of I/O interconnect topologies may be utilized such as the PCI Express architecture, available through Intel® Corporation of Santa Clara, Calif.

The PCI bus 530 may be coupled to an audio device 532 and one or more disk drive(s) 534. Other devices may be coupled to the PCI bus 530. In addition, the CPU 508 and the MCH 514 may be combined to form a single chip. Furthermore, the graphics accelerator 522 may be included within the MCH 514 in other embodiments.

Additionally, other peripherals coupled to the PCH 526 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 502 may include volatile and/or nonvolatile memory.

Thus, there is described herein an architecture and associated methods to implement scalable secure execution in electronic devices. In some embodiments the architecture uses hardware capabilities embedded in remote electronic device platform to perform computationally expensive processing tasks for a secure controller in a separate device. The execution complex may be implemented in a trusted execution engine such that operations are not accessible to malware on an electronic device. In some embodiments the trusted execution engine may be implemented in a remote or attachable device, e.g., a dongle.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller for a first electronic device comprising: processing circuitry defining logic configured to:
    establish a pairing with a remote processor in a second electronic device;
    create a first secure communication channel with the remote processor, wherein the first secure communication channel is secured at least in part by a shared secret developed between the controller and the remote device;
    generate a confirmation code;
    transmit the confirmation code and a confirmation page to the remote processor via the first secure channel;
    receive, via a second communication channel, a bitmap for a login screen, wherein the bitmap is encrypted using the shared secret and comprises one or more coordinates for user input;
    present the bitmap on a display module coupled to the controller;
    receive a login input from the display module at a location corresponding to the one or more coordinates on the bitmap; and
    initiate a communication session between the controller and a remote device when the login input received from the display module indicates that the login is authorized.

2. The controller of claim 1, wherein the logic comprises a near field wireless communication interface to communicate with the remote processor.

3. The controller of claim 1, further comprising a local processor coupled to the controller, and wherein the local processor comprises logic configured to:
    receive, from the remote processor, an output of the first portion of the processing task; and
    present the output on a display coupled to the local controller.

4. The controller of claim 3, wherein the local processor further comprises logic configured to:
    receive an input from an input device; and
    pass the input to the controller.

5. The controller of claim 1, further comprising logic configured to validate the input.

6. An electronic device, comprising:
    a processor which is to implement an untrusted computing environment; and
    a controller, comprising:
        processing circuitry defining logic configured to:
            establish a pairing with a remote processor in a second electronic device;
            create a first secure communication channel with the remote processor, wherein the first secure communication channel is secured at least in part by a shared secret developed between the controller and the remote device;
            generate a confirmation code;
            transmit the confirmation code and a confirmation page to the remote processor via the first secure channel;
            receive, via a second communication channel, a bitmap for a login screen, wherein the bitmap is encrypted using the shared secret and comprises one or more coordinates for user input;
            present the bitmap on a display module coupled to the controller;
            receive a login input from the display module at a location corresponding to the one or more coordinates on the bitmap; and initiate a communication session between the controller and a remote device when the login input received from the display module indicates that the login is authorized.

7. The electronic device of claim 6, wherein the logic comprises a near field wireless communication interface to communicate with the remote processor.

8. The electronic device of claim 6, further comprising a local processor coupled to the controller, and wherein the local processor comprises logic configured to: receive, from the remote processor, an output of the first portion of the processing task; and present the output on a display coupled to the local controller.

9. The electronic device of claim 8, wherein the local processor further comprises logic configured to:
receive an input from an input device; and
pass the input to the controller.

10. The electronic device of claim 6, further comprising logic configured to validate the input.

11. A method, comprising:
establishing a pairing between a controller in a first electronic device and a remote processor in a second electronic device;
creating a first communication channel between the controller and the remote processor, wherein the first secure communication channel is secured at least in part by a shared secret developed between the controller and the remote device;
generating a confirmation code;
transmitting the confirmation code and a confirmation page to the remote processor via the first secure channel;
receiving, via a second communication channel, a bitmap for a login screen, wherein the bitmap is encrypted using the shared secret and comprises one or more coordinates for user input; presenting the bitmap on a display module coupled to the controller;
receiving a login input from the display module at a location corresponding to the one or more coordinates on the bitmap; and
initiating a communication session between the controller and a remote device when the login input received from the display module indicates that the login is authorized.

12. The method of claim 11, further comprising adding a confirmation code to the first portion of the processing task.

13. The method of claim 11, further comprising: receiving, in the local processor, an input from an input device; and passing the input from the local processor to the controller.

14. The method of claim 11, further comprising validating the input.

15. A computer program product comprising logic instructions stored on non-transitory computer readable medium which, when executed by a controller, configure the controller to:
establish a pairing with a remote processor in a second electronic device;
create a first secure communication channel with the remote processor, wherein the first secure communication channel is secured at least in part by a shared secret developed between the controller and the remote device;
generate a confirmation code;
transmit the confirmation code and a confirmation page to the remote processor via the first secure channel;
receive, via a second communication channel, a bitmap for a login screen, wherein the bitmap is encrypted using the shared secret and comprises one or more coordinates for user input;
present the bitmap on a display module coupled to the controller;
receive a login input from the display module at a location corresponding to the one or more coordinates on the bitmap; and
initiate a communication session between the controller and a remote device when the login input received from the display module indicates that the login is authorized.

16. The computer program product of claim 15, wherein the logic comprises a near field wireless communication interface to communicate with the remote processor.

* * * * *